United States Patent [19]
Murray

[11] Patent Number: 5,632,497
[45] Date of Patent: May 27, 1997

[54] PORTABLE FLOOR LEVEL CART ASSEMBLY

[76] Inventor: Edward Murray, 19375 Carolina Cir., Boca Raton, Fla. 33434

[21] Appl. No.: 448,746

[22] Filed: May 24, 1995

[51] Int. Cl.$^6$ ..................................... B62B 3/10
[52] U.S. Cl. ................. 280/47.35; 280/2; 280/79.5
[58] Field of Search .................. 280/79.5, 79.2, 280/2, 47.34, 47.35, 32.5, 5.24, 79.11

[56] References Cited

U.S. PATENT DOCUMENTS

| | | | |
|---|---|---|---|
| 290,759 | 12/1883 | Eberhard | 280/79.11 |
| D. 300,802 | 4/1989 | Raby | D8/71 |
| D. 302,618 | 8/1989 | Gottselig | D34/23 |
| D. 345,841 | 4/1994 | Bekins | D34/26 |
| 2,543,697 | 2/1951 | Lanter | 280/79.2 |
| 3,031,207 | 4/1962 | Bard | 280/79.2 |
| 3,285,447 | 11/1966 | Junion | 280/79.11 |
| 3,788,662 | 1/1974 | Rasmussen et al. | 280/79.2 |
| 3,976,155 | 8/1976 | Esch | 280/32.5 |
| 3,997,092 | 12/1976 | Pogwizd | 224/5 A |
| 4,127,202 | 11/1978 | Jennings et al. | 280/79.11 |
| 4,222,580 | 9/1980 | Krokonko | 280/79.2 |
| 4,331,341 | 5/1982 | McKeown | 280/47.34 |
| 4,993,726 | 2/1991 | Schumacher et al. | 280/38 |
| 5,002,293 | 3/1991 | Gottselig | 280/47.35 |
| 5,052,703 | 10/1991 | Bertrand | 280/47.34 |
| 5,082,301 | 1/1992 | Schumacher et al. | 280/38 |
| 5,380,023 | 1/1995 | McBee | 280/79.2 |
| 5,390,944 | 2/1995 | Sherwin | 280/47.35 |
| 5,445,396 | 8/1995 | Sebor | 280/33.998 |

FOREIGN PATENT DOCUMENTS

| 2015238 | 10/1971 | Germany | 280/79.11 |
|---|---|---|---|
| 2133977 | 8/1984 | United Kingdom | 280/79.11 |

*Primary Examiner*—Anne Marie Boehler
*Attorney, Agent, or Firm*—John C. Smith

[57] ABSTRACT

A portable cart assembly for use in tile or marble installation and for transporting mortar, water, tiles, marble, and associated tools. A low elevation platform carries a mortar pail just above floor level such that the top of the mortar pail is at the lowest possible level. The low level minimizes the amount of bending required from a tile worker to reach the mortar during installation of tiles or marble. The device has offset wheels which are attached to the perimeter of the platform such that the wheels allow mobility but do not increase the clearance between the low elevation platform and the floor. The wheels can be attached to an optional raised perimeter ring that provides auxiliary storage for tools. Multiple carts can be attached in train like fashion and pulled to the work site by a handle assembly.

4 Claims, 5 Drawing Sheets

PORTABLE FLOOR LEVEL CART ASSEMBLY

BACKGROUND OF THE INVENTION

1. Technical Field

The present invention relates to carts used for moving heavy materials. In particular, it relates to carts used to move heavy materials such as mortar, tiles and marble into position during the installation process, and which further minimizes the amount of bending required of the installer during the installation process.

2. Background Art

Currently, flooring installer's have had to carry tiles or marble (hereinafter collectively referred to as tiles) to the locations where they are to be laid. In addition, containers of mortar and water were carried to the installation point as well as required tools. In a commercial environment, it is typical to use containers of mortar and water with a capacity of five gallons. Due to the size of the containers used, the installer is subjected to high levels of physical stress which can lead to both inefficiency and injury.

Known wheeled carts are capable of carrying tiles, mortar, etc., to the installation location. However, prior art devices are elevated. During the installation process, the installer is usually kneeling on the floor to spread the mortar and lay the tile. The most convenient location for the mortar container is as close to the floor as possible to allow the installer to reach the mortar supply with the minimum amount of bending. Therefore, any supplies or equipment on the raised cart must be moved to the floor for convenient access by the installer. Further, even if a cart with short legs is used, the installer would be required to continuously raise up from the installing position to reach into the five gallon container which holds the mortar. In addition to the stress on the installer's back, the level of efficiency is reduced to the increased time it takes to reach the mortar container. As a result, while prior art devices have provided improved ease when transporting heavy material such as mortar containers, they have also contributed to unnecessary work and inefficiency for the installer.

Of course, the installer can place the container directly on the floor. By locating the container on the floor, the installer is as close as possible to the mortar while laying tiles. This allows for easier mortar spreading and less movement by the installer to retrieve the mortar. However, this also requires the considerable physical exertion of having to move the mortar container every time the installer moved to the location of the next tile. As a result, the placement of the mortar container directly on the floor has considerable disadvantages.

Another problem associated with tile installation is that in addition to the weight of the tiles and mortar, the number of tools used by the installer can be cumbersome to carry on the installer's person. If the tools are instead installed on a cart, the same problems associated with spreading the mortar arise. Namely, the installer has to raise up from the work area to reach the desired tool.

The prior art has failed to provide a device which provides easy and convenient transport of tiles, mortar, and tools while simultaneously locating the mortar container in near proximity to the floor and the tools at an easy to reach location near the floor.

SUMMARY OF THE INVENTION

The present invention solves the foregoing problems by providing a portable cart assembly for tile or marble installation which transports mortar, water, tiles, marble, and associated tools while simultaneously keeping the mortar container in close proximity to the floor. A centrally located low elevation platform carries a mortar pail just above floor level such that the top of the mortar pail is at the lowest possible level for easy access. The low level minimizes the amount of bending required from a tile worker to reach the mortar during installation of tiles or marble. A perimeter wall surrounds the low elevation platform to prevent the mortar container from slipping off the low elevation platform. An optional raised shelf extends from the high end of the perimeter wall provides storage for the installer's tools. The device has offset wheels which are attached to the perimeter wall and touch the floor just below the plane of the low elevation platform such that the wheels allow mobility but do not increase the clearance between the low elevation platform and the floor. The wheels can also be attached to the optional raised shelf that provides auxiliary storage for tools. Multiple carts can be attached in train like fashion and pulled to the work site by a handle assembly.

DESCRIPTION OF THE PREFERRED EMBODIMENT

For ease of discussion, the following terms will be used in this disclosure. The term tile will be used to describe both tiles and marble. The term mortar will be used to describe mortar, cement, adhesive, or any other bonding material which may be suitable for tile installation.

Figure 1:
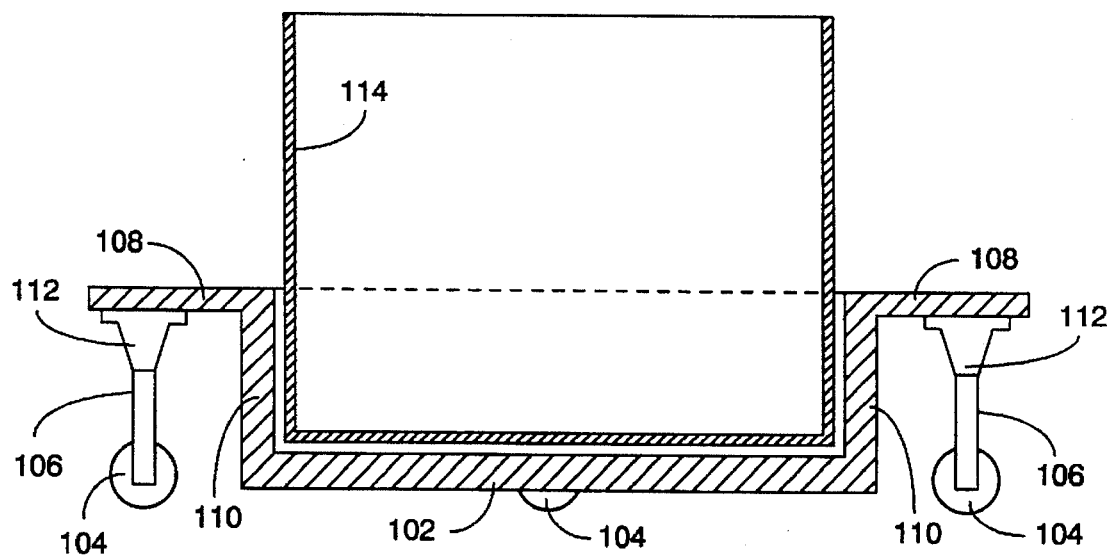
FIG. 1 is a side sectional view of the portable cart with a mortar container mounted in the recessed area formed by the low elevation platform and the perimeter wall.

Referring to FIG. 1, a container 114 is shown mounted in the invention. Container 114 rests on low elevation platform 102. Perimeter wall 110 extends upward from the edge of low elevation platform 102 forming a recessed area into which container 114 can be securely placed. One function of perimeter wall 110 is to prevent container 114 from sliding off of low elevation platform 102. Those skilled in the art will recognize that perimeter wall 110 can be continuous wall which encircles low elevation platform 102 or it can be made from a plurality of independent segments, each extending upward from the low elevation platform 102. A raised shelf 108 is attached to perimeter wall 110. In this embodiment, wheel assembly 104, 106, 112 is comprised of wheel 104, wheel holder 106, and swivel 112. The preferred embodiment uses a swiveling wheel for easier movement of the device.

As can be seen, low elevation platform 102 is just slightly elevated above the bottom of wheels 104. In this position, the device can be freely moved over flat surfaces with dragging low elevation platform 102 on the floor. At the same time, container 114 is positioned in close proximity to the floor. When the installer is in the process of spreading mortar on the floor, the relatively low elevation of container 114 allows easier access to the mortar and reduces the need for the installer to continually raise up to retrieve more mortar. As a result, the installer has less physical stress, and can install tiles faster and more efficiently. The advantages in stress and efficiency are achieved due to the low elevation which is in turn a result of using the offset wheels. By offsetting the wheels as is shown in FIG. 1, the distance between the floor and the bottom of low elevation platform 102 is only a fraction of the size of the wheel assembly 104, 106, 112.

Figure 2:
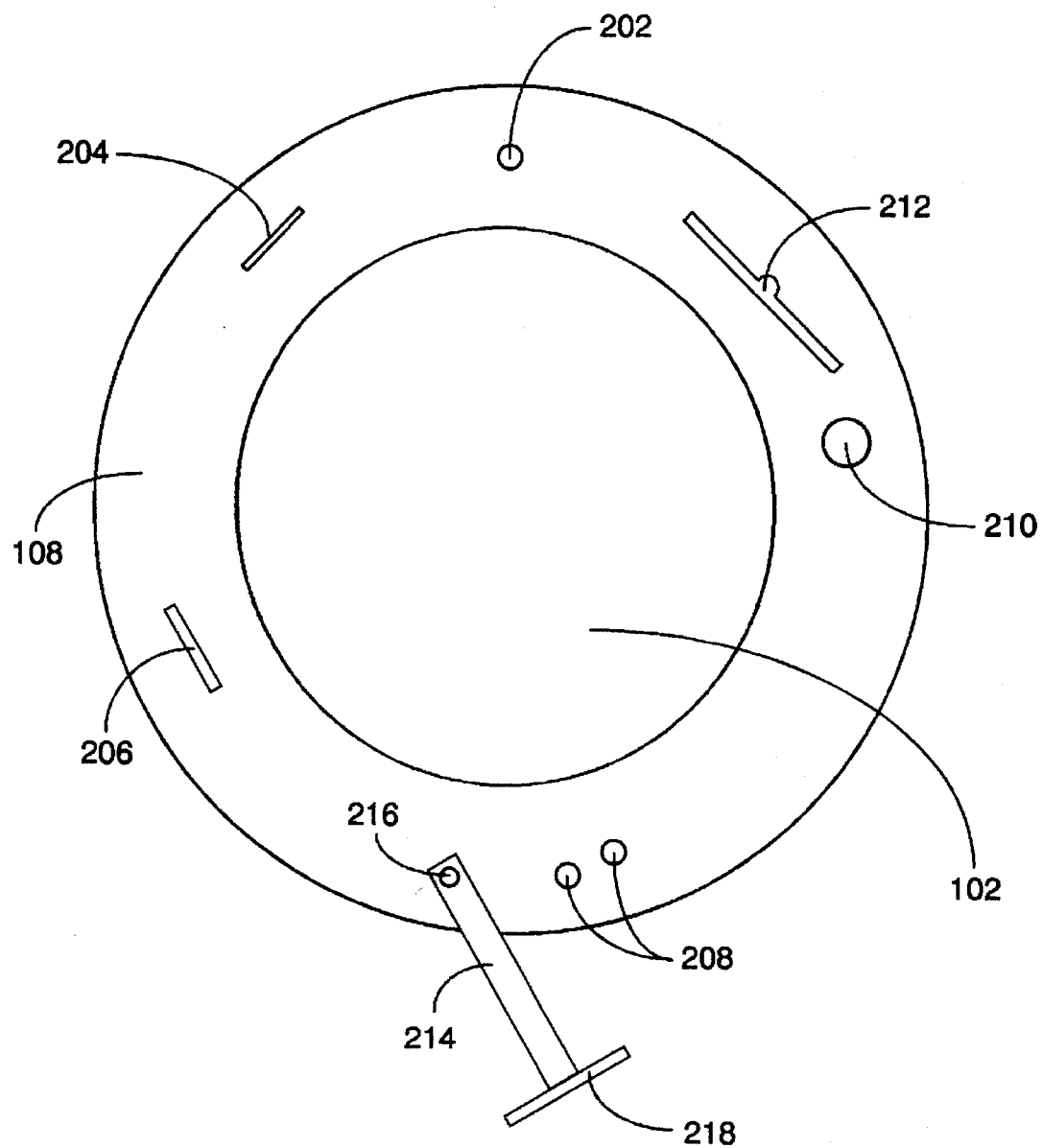
FIG. 2 shows a top view of the portable cart showing the raised shelf with tool storage apertures.

FIG. 2 is a top view of the device which illustrates an additional use for raised shelf 108. The raised shelf 108 can be provided with a variety of apertures 202-212 designed to hold the tools used by installers. By locating raised shelf 108 above the low elevation platform 102, room is left for tools to extend below raised shelf 108 without contacting the floor surface. At the same time, the tools are kept at a low level which allows the installer to reach them with relative ease. In particular, it eliminates the need for the installer to carry the tools on the installer's person or the need to raise up to get a tool from an elevated cart every time one is needed.

In addition to tool storage apertures 202-212, FIG. 2 also illustrates handle assembly 214, 216 which attaches to cart connector 216. In the preferred embodiment, handle assembly 214, 216 includes flexible strap 214 and rigid handle 216. However, any suitable handle can be used. For example, rigid handle 216 can be replaced a simple loop made from the end of flexible strap 214. Handle assembly 214, 216 allows the installer to pull the device to any desired location from a comfortable standing position even though the cart rests close to the floor.

FIG. 2 also illustrates the configuration of the raised shelf 108 as used in the preferred embodiment. In this embodiment, the raised shelf 108 forms a closed ring which acts to provide tool storage around the entire periphery of the device. In addition, the ring formed by raised shelf 108 prevents the container 114 from slipping off of the low elevation platform 102 when the device is being moved.

Figure 3:
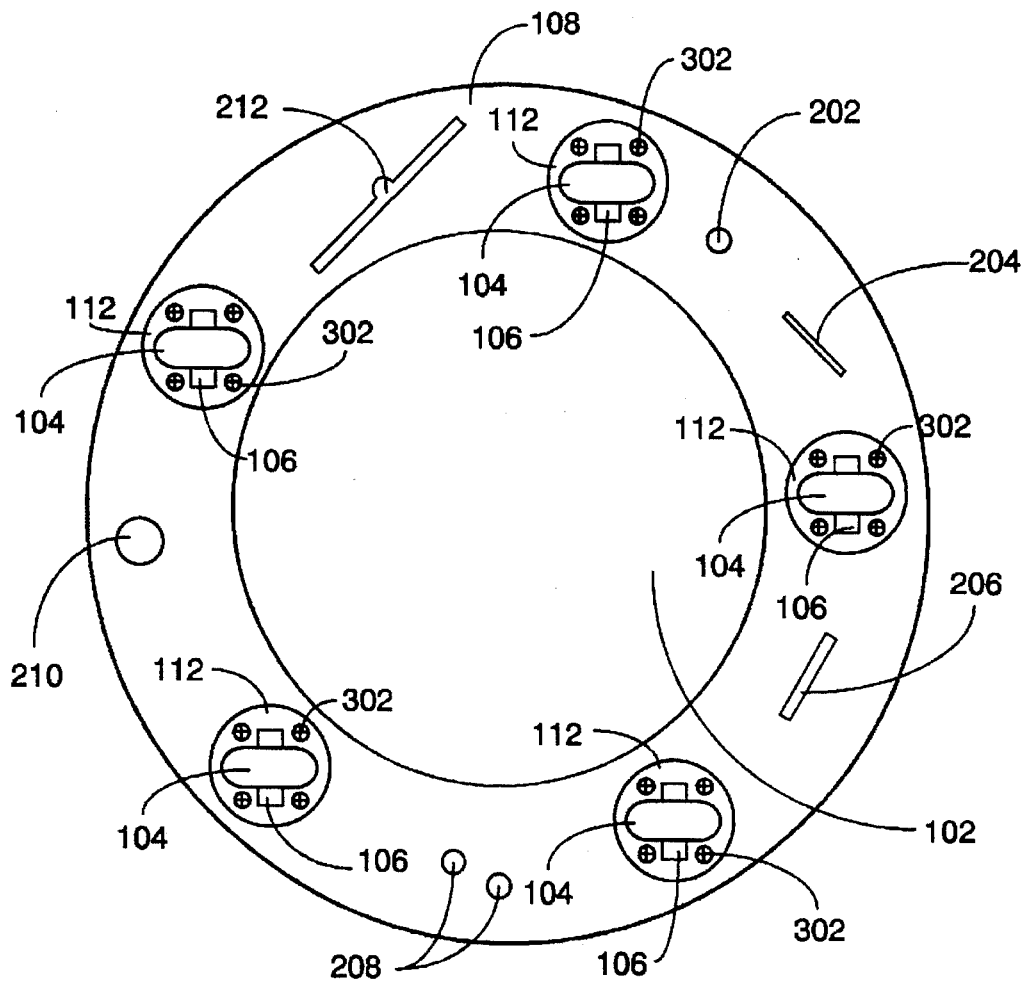
FIG. 3 shows a bottom view of the portable cart showing the offset wheels mounted on the raised shelf.

FIG. 3 is a bottom view of the device which shows the wheel assembly 104, 106, 112 attached to raised shelf 108 via screws 302. Of course, any suitable method of attaching the wheel assemblies 104, 106, 112 to the raised shelf 108 can be used. As will be discussed below, wheel assemblies 104, 106, 112 can also be attached to the peripheral wall 110 instead of raised shelf 108.

Figure 4:
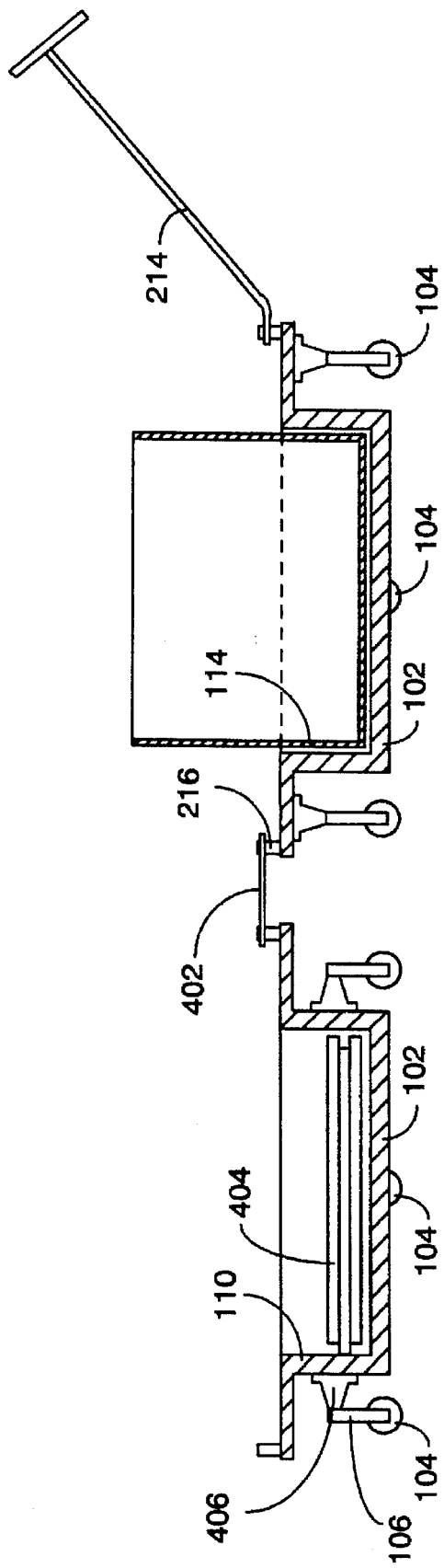
FIG. 4 is a side sectional view of a multi-cart embodiment of the portable cart with independent cart units. A mortar container mounted in the recessed area formed by the low elevation platform and the perimeter wall of independent one cart unit, a supply of tiles in a second independent cart unit which has an alternative wheel mount, a linking device to connect the two independent cart units, and a handle assembly to provide for pulling the device.

FIG. 4 illustrates an alternative embodiment of the invention. In this embodiment, a plurality of carts are attached together by means of a linking device 402. Linking device 402 can be a solid rod, flexible strap, etc. The only requirement is that the carts be able to freely move and that the linking device has suitable strength. Linking means 402 is attached to the carts by cart connector 216. In the preferred embodiment, cart connector 216 can be used to secure the handle assembly 214, 218 or linking means 402. The advantage of linking the carts together is that a single installer can move more materials at once, thereby saving time. As can be seen from FIG. 4, a variety of materials, such as container 112 and tiles 404 can be carried.

Also shown in FIG. 4 is an alternative embodiment of the wheel assembly 104, 106, 406. In this embodiment, wheel assembly 104, 106, 406 is attached to peripheral side wall 110 rather than raised shelf 108. As a result, raised shelf 108 is optional.

Figure 5A:
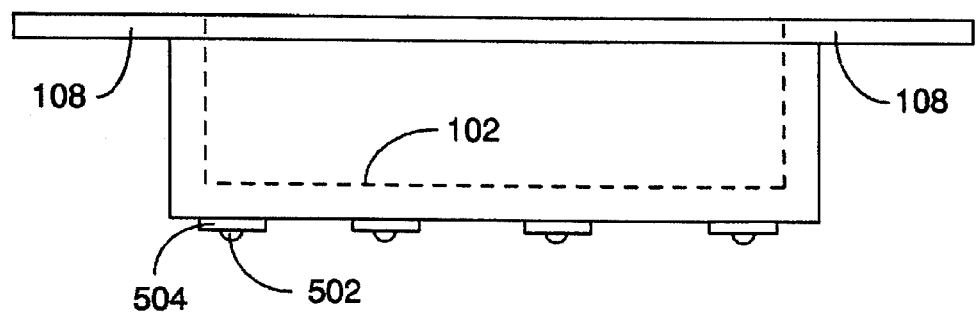
FIG. 5A and 5B show a side and a bottom view, respectively, of an alternative embodiment of the portable cart with low profile bearings mounted beneath the low elevation platform.
Figure 5B:
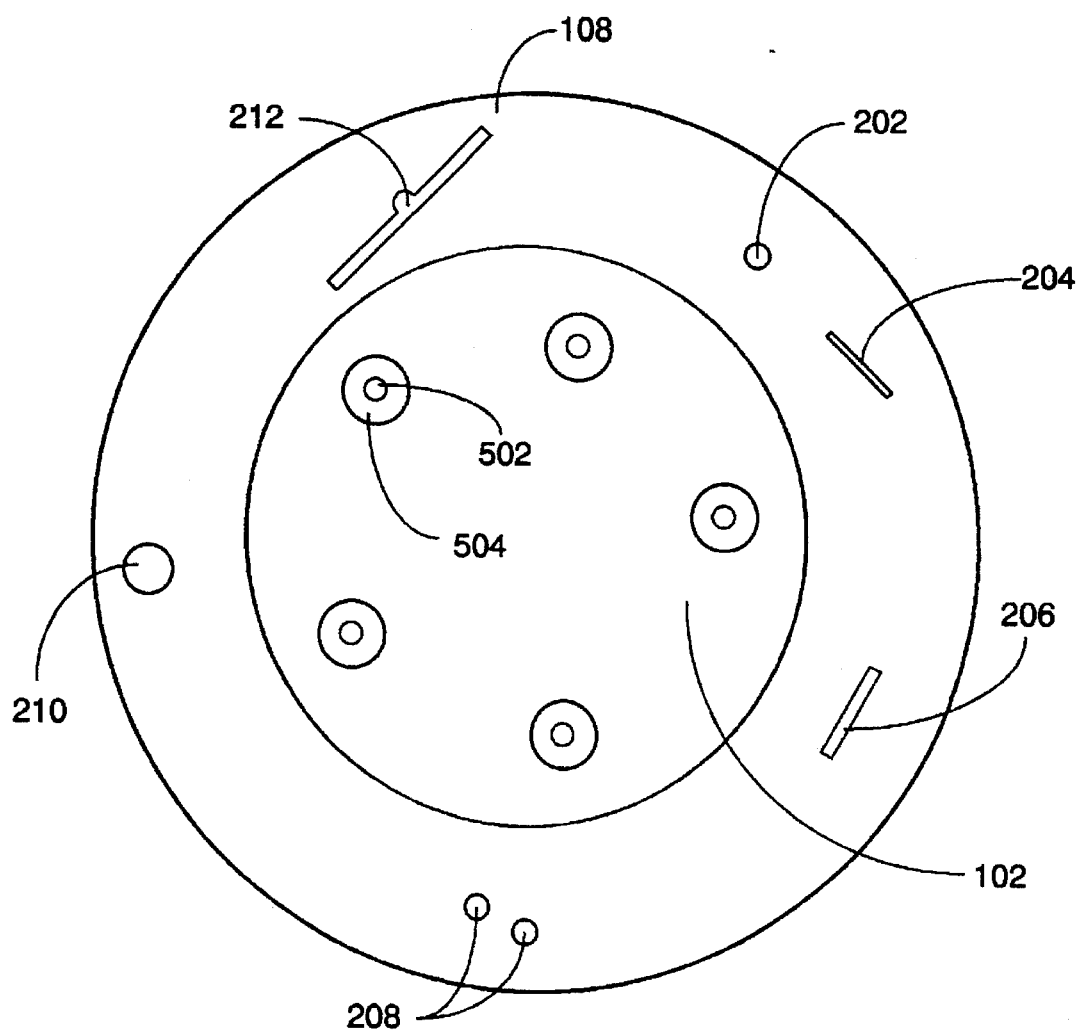

FIG. 5A and 5B show another embodiment, in which the offset wheel 104 are replaced with bearings 502 mounted in a low profile mount 504. This embodiment is slightly more elevated than the previous embodiments. Also, if the raised shelf 108 is not used, the device takes less floor space during use and requires less space to store. In all other aspects, this embodiment functions the same as the previous embodiments.

The material used to construct the device can be any material of suitable strength, such as wood, plywood, metal, plastic, etc. In the preferred embodiment, three quarter inch plywood is used due to its combination of features which include low cost, high strength, easy workability, etc. The swivel wheel assemblies 104, 106, 112 are well known in the art and can be selected from any number of suitable commercially available sources. Likewise, the handle straps can be fabricated from inexpensive materials such as leather, fiber rope, nylon rope, etc.

Likewise, while the preferred embodiment is designed to hold five gallon containers 114, those skilled in the art will recognize that the size can vary to suit any number of container 114 sizes.

While the invention has been described with respect to a preferred embodiment thereof, it will be understood by those skilled in the art that various changes in detail my be made therein without departing from the spirit, scope, and teaching of the invention. For example, a variety of wheel types may be used, the device can be constructed from a variety of materials such as wood, plastic, metals, etc., sizes can vary, and wheel attachment points can vary. Accordingly, the invention herein disclosed is to be limited only as specified in the following claims.

I claim:

1. A portable cart for moving containers used by a flooring installer, comprising:

a low elevation platform having an upper surface and a bottom surface, the low elevation platform further having a plurality of low profile bearing assemblies mounted on the bottom surface such that the low elevation platform can be rollably moved;

a perimeter wall attached to the low elevation platform in substantial proximity to the perimeter of the low elevation platform and projecting upward from the low elevation platform, the perimeter wall having sufficient height to prevent a container placed on the low elevation platform from sliding off of the low elevation platform when the portable cart is moved, the perimeter wall further being sufficiently low to allow access to the container by a flooring installer without requiring the flooring installer to raise up from the work position; and a raised shelf attached to the perimeter wall and extending outward from the perimeter wall, the raised shelf further having at least one aperture for storage of tools;

whereby a flooring installer can access containers without raising up from the work position.

2. A portable cart, as in claim 1, further comprising handle means attached to the raised shelf and sufficiently long such that the portable cart can be pulled from a standing position during normal use.

3. A portable cart, as in claim 2, wherein the raised shelf attached to the perimeter wall encircles the low elevation platform such that the inner diameter of the raised shelf defines a recessed area above the low elevation platform.

4. A portable cart, as in claim 1, wherein the raised shelf attached to the perimeter wall encircles the low elevation platform such that the raised shelf defines a recessed area above the low elevation platform.

* * * * *